United States Patent
Recce

(10) Patent No.: US 10,482,496 B1
(45) Date of Patent: *Nov. 19, 2019

(54) AUTOMATIC PERFORMANCE-TRIGGERED CAMPAIGN ADJUSTMENT

(71) Applicant: Quantcast Corporation, San Francisco, CA (US)

(72) Inventor: Michael Recce, Short Hills, NJ (US)

(73) Assignee: Quantcast Corporation, San Francisco, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/521,159

(22) Filed: Oct. 22, 2014

(51) Int. Cl.
*G06Q 30/02* (2012.01)
*G06Q 10/06* (2012.01)

(52) U.S. Cl.
CPC ....... *G06Q 30/0251* (2013.01); *G06Q 10/067* (2013.01); *G06Q 30/0275* (2013.01)

(58) Field of Classification Search
CPC ..... G06Q 30/00; G06Q 30/02; G06Q 30/0271
USPC ...................................... 705/14.46
See application file for complete search history.

(56) References Cited

U.S. PATENT DOCUMENTS

| 2005/0166233 | A1* | 7/2005 | Beyda ................... | G06Q 30/02 725/46 |
| 2006/0004628 | A1* | 1/2006 | Axe ....................... | G06Q 30/02 705/14.46 |
| 2008/0249832 | A1* | 10/2008 | Richardson ........... | G06Q 30/02 705/14.46 |
| 2013/0346182 | A1* | 12/2013 | Cheng ................ | G06Q 30/0242 705/14.41 |

* cited by examiner

*Primary Examiner* — Marilyn G Macasiano
(74) *Attorney, Agent, or Firm* — Robin W. Reasoner; Andrea Wheeler

(57) ABSTRACT

Automatic performance triggered campaign adjustment. A hierarchical feature tree is generated. Each child node's feature is more specific than its respective parent node's feature. The discovery system creates a behavioral model comprising features of the feature tree which is used in the operation of an advertising campaign. A degraded model feature is detected at the discovery system by comparing a performance metric of a model feature from two different time windows. The discovery system matches a node of the feature tree with the degraded feature and selects a prospective model feature from an ancestor node of the matching feature's node. An estimated performance metric for the prospective model feature is determined and the results are used to decide if the prospective model feature should be incorporated into an updated model or not. The model can be updated with a new model feature selected from one or more prospective model features.

20 Claims, 7 Drawing Sheets

500

Construct a feature tree with nodes of the feature tree representing features and each child node feature more specific than a feature of its parent node (Step 510).

Build a model comprising multiple features of the feature tree (Step 520).

FIG 5

AUTOMATIC PERFORMANCE-TRIGGERED CAMPAIGN ADJUSTMENT

FIELD OF INVENTION

The invention relates to methods and systems for online advertising.

BACKGROUND OF INVENTION

Information collected during Internet browsing has traditionally been used to select entities for the delivery of online advertising. Behavioral models can be built to assess the suitability of an entity for receiving an advertisement based on the entity's inferred similarity to a converter or target audience. Based on the results of applying the behavioral model to an entity's history, a campaign operator can make decisions such as how much to bid on a Real Time Bidding (RTB) Exchange for an opportunity to expose the entity to advertising, how to customize advertising content or both.

Some features which indicate a strong similarity to a converter audience may not change frequently. However, the importance of some features may wax and wane dramatically in response to unpredictable news events, fads and fashion trends. What is needed is an automated modeling system capable of adjusting the features used to select entities for the delivery of online advertising content.

SUMMARY OF INVENTION

Embodiments of the invention provide a system, method, and computer-readable medium which automatically detects degraded features of a model, selects at least one prospective model feature and updates a degraded model with a new model feature selected from the prospective model feature(s).

In an embodiment, a feature tree is generated. The feature tree has a root node and is a hierarchical tree, with each node corresponding to at least one feature. Each child node is more specific or granular than its parent node. For example, a parent node may represent a broad feature such as "content topic of severe weather" and have two child nodes representing more narrowly defined features (e.g. a first child node representing "content topic of hurricanes" and a second child node representing "content topic of tornados"). The discovery system creates a behavioral model comprising at least one feature found in the nodes of the feature tree. An entity's suitability for receiving an advertisement may be assessed by applying the model to features found in the entity's history. The model is used in the operation of an advertising campaign. A degraded model feature is detected at the discovery system by comparing a performance metric of a model feature from a first time window to the performance metric of a model feature from a second time window. The performance metric of a feature is an indication of the predictive value of the feature. The frequency with which a model feature appears in the histories of campaign converters during a time window compared to the frequency with which the same model feature appears in the histories of a standard audience during the same time window is an example measure of a feature's performance metric; for a model feature with a positive correlation with campaign converters, as this measure decreases, the importance of the model feature degrades. The discovery system matches a node of the feature tree with the degraded feature and selects a prospective model feature from a higher level node (or nodes), such as an ancestor node (or nodes) of the matching feature's node. An estimated performance metric for the prospective model feature is determined for the second window and the results can be used to decide if the prospective model feature should be incorporated into an updated model or not. The model can be updated with a new model feature selected from one or more prospective model features. Advantageously, this enables the performance system to automatically maintain the efficiency of a model for an advertising campaign despite dynamic or unpredictable changes in the market.

In an embodiment, the discovery system monitors the success of an advertising campaign, and initiates the activity of detecting a degraded feature in response to a drop in a performance metric of the advertising campaign. For example, the performance of an advertising campaign may be indicated by: average Cost Per Acquisition (CPA), conversion rate, conversion volume, or combinations thereof.

In an embodiment, the performance metric of a feature is a measure of the frequency of the feature in the histories of converters. In an example, the performance metric of a feature is a measure of the frequency of the feature in the histories of converters compared to the known or estimated frequency of the same feature in a standard population. In some cases, the performance metric of a feature can further incorporate a measure of the recency of the feature in the histories of converters.

In an embodiment, in response to detecting a degraded feature, the discovery system searches for updated features and updates the feature tree by inserting one or more new nodes, with each new node representing an updated feature. For example, the discovery system may receive a list of query terms submitted to an online search engine and update the feature tree with a new node representing a previously unseen query term or a trending query term (i.e. a query term which is detected with increasing frequency). The timely exploration for updated model features may be triggered as the result of detecting a decline in the performance of a campaign, a decline in the performance of a model feature or both. Advantageously, resources for exploring the feature space can be automatically applied in close proximity to the time when acquiring an updated set of features becomes important.

In an embodiment, more than one prospective model feature may be selected. In an example, the granularity of a model feature may be adjusted by probing nodes from multiple levels of the hierarchical feature tree such as same level nodes and lower level nodes. In a hierarchical tree structure, a lower level node is farther from the root node than a higher level node. For example, in some cases, multiple nodes of the same level as the matching feature's node (e.g. sibling nodes, cousin nodes), lower level nodes (e.g. descendant nodes, child nodes, nephew nodes) or combinations thereof may be selected in addition to one or more higher level nodes, the estimated performance metrics of the selected nodes may be determined, and the model may be updated with features of one or more of the selected nodes based on the estimated performance metrics.

In an embodiment, a degraded feature may be removed from the model in response to a feature tree update. Advantageously, this keeps the model from growing unnecessarily large. Because the models may be used in a real time bidding (RTB) environment under very tight time constraints, it is beneficial to create compact models which can be applied to an entity's history quickly.

BRIEF DESCRIPTION OF DRAWINGS

FIG. 5 is a flow chart illustrating an example of a method of building a model using features represented by nodes of a feature tree, according to an embodiment;

DETAILED DESCRIPTION OF THE INVENTION

Figure 1:
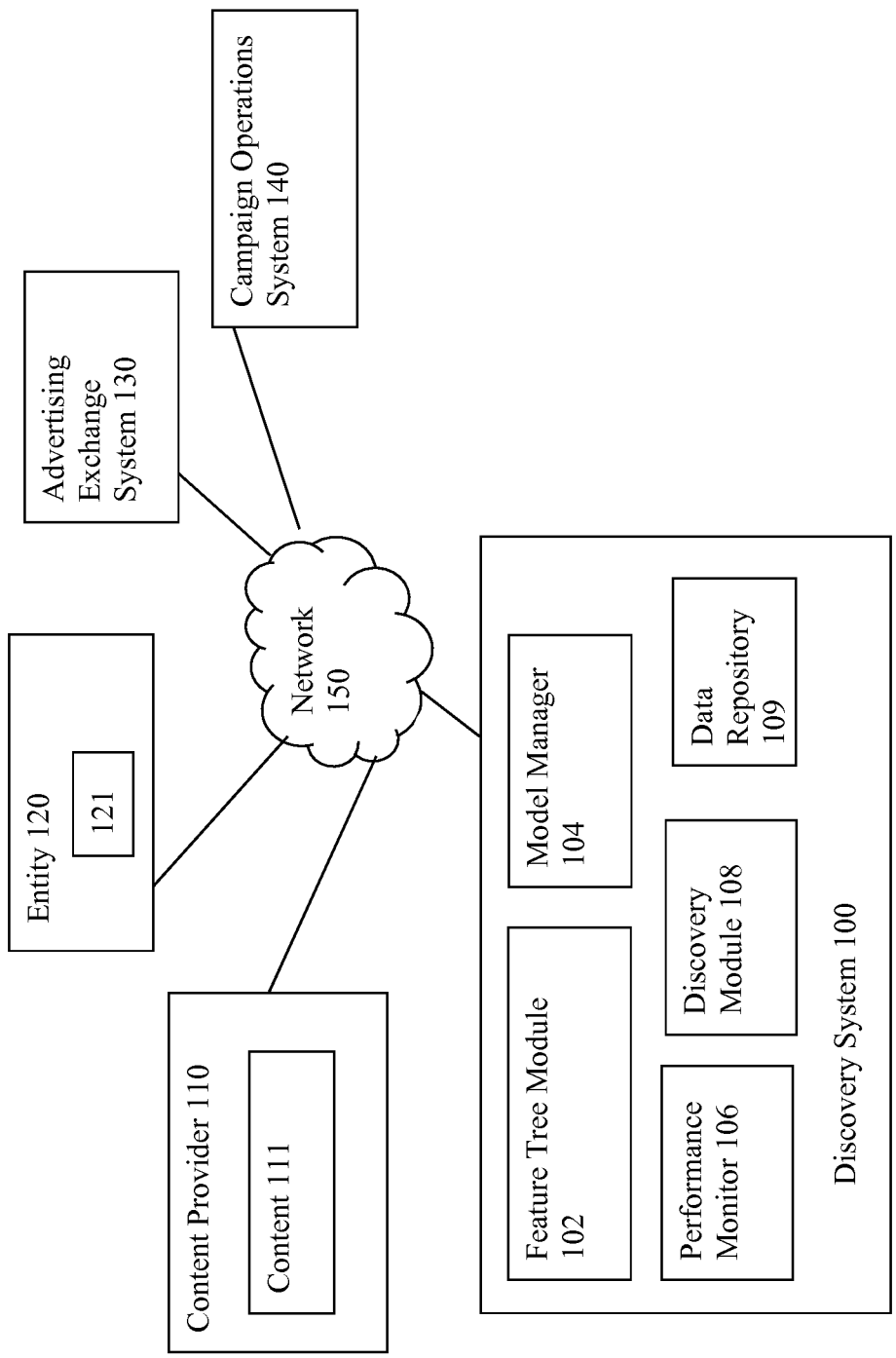
FIG. 1 illustrates an example computing environment in accordance with an embodiment of the invention.

FIG. 1 illustrates an example computing environment in accordance with an embodiment of the invention. In particular, the discovery system 100 generates a hierarchical feature tree with each child node representing a feature that is more specific than its respective parent node's feature. The discovery system creates a model. The model comprises features of the feature tree. The model can be applied to an entity's history to assess the entity's suitability for receiving an advertisement. The discovery system detects a feature which has degraded over time by comparing the model feature's performance metrics from two different time windows. The degraded feature is matched with a feature of a node of the feature tree. A higher level node which is closer to the root of the feature tree, such as an ancestor node, is selected and a feature of the higher level node is selected and an estimated performance metric is determined for the selected feature. If the estimated performance metric is an improvement over the degraded feature's performance metric for the same time window, it is an indication that the degraded feature was too granular, and that the less granular feature of the higher level node should be incorporated into the model. Developing models too frequently is a resource intensive endeavor. However, operating stale models with outdated features can lead to ineffective advertising campaigns. Advantageously, the discovery system can automatically develop a new model, with an updated feature set, in response to changes in the performance of a model feature, the performance of an advertising campaign or combinations thereof.

FIG. 1 illustrates an example computing environment in accordance with an embodiment of the invention. As shown in FIG. 1, the discovery system 100, a content provider 110, an entity 120, an advertising exchange system 130 and a campaign operations system 140. These elements are connected by a communications network 150, such as a local area network, a wide area network, a wireless network, an intranet, a cable network, a satellite network, a cellular phone network, an optical network, the Internet or combinations thereof.

Content provider 110 sells opportunities to expose entities to advertising content. A content provider such as a website operator may provide media such as website content to a visitor and sell the opportunity to expose their visitors to advertising content. A content provider may make services such as mapping services available to a mobile device operator and sell the opportunity to expose the mobile device operator to advertising content in conjunction with their services. A content provider may provide downloadable software, such as a mobile phone application, and sell the opportunity to expose the operator of the downloadable software with advertising content in conjunction with the delivery of the downloadable software, the operation of the downloadable software or both.

Advertising content is delivered over the communications network 150 to an entity. For example, an entity can be a visitor to the media available through the content provider, a user of services available through the content provider, an entity which downloads software available through the content provider, a mobile application operator or combinations thereof. Examples of content providers 110 can include web site operators, cable television operators, online service vendors, mobile application vendors and mobile application service providers. Examples of advertising content can include, but are not limited to advertising content embedded in a web page, advertising content provided in conjunction with a web page (i.e. a banner ad, a pop-over ad, a pop-under ad), an online video clip, an advertisement embedded in a cable television program, an advertisement provided via a mobile application, an audio clip, an advertisement provided in conjunction with the results of a keyword search from an online search engine or an advertisement provided in conjunction with the results of a request for directions from an online mapping service. In some examples, advertising content can be provided over the communications network 150, based on a request to content provider 110; in some examples, content provider 110 or a content provider's proxy can push advertising content over the communications network 150 to an entity 120. Although only one content provider 110 is shown in FIG. 1 for clarity, multiple content providers may be connected to the communications network 150.

In various embodiments, an entity 120, accesses content 111 from a content provider 110 over the communications network 150. Examples of entities can include end-users, consumers, customers, software installations or hardware devices used to access content or combinations thereof. Software installations can include a web browser instance, video viewer instance or set-top box software residing on a hardware device. A hardware device can comprise a computer, personal digital assistant (PDA), cell phone or set-top unit (STU) such as a STU used in conjunction with cable television service. A consumer is a person or group of people who access content. In some cases, an entity can comprise a combination of entities which are logically grouped together to represent individuals, households or groups of individuals who access content 111 over a communications network 150. An entity which receives content 111, such as a web page, from a content provider 110, such as a website, can also be called a visitor to content provider 110. In an example, an entity can receive content 111, such as software downloaded over the network 150, from a content provider 110, such as a mobile applications or mobile services provider. In an example, an entity can access services provided by a content provider 110 over a network 150.

In some examples according to the current invention, an entity may represent an individual person. However, in some cases, an entity may represent a user, a web site visitor, a registered user, a licensed seat and/or a logical agglomerative grouping or subset thereof such as, but not limited to, a business, a family, household, social network, team and/or department.

As shown in the embodiment of FIG. 1, an entity can store a variable value. For example, an entity can locally store a software variable value such as a cookie value. An operating system installed on a mobile device can store an operating system variable locally on a mobile device. In some cases, an entity can store multiple variable values, such as multiple first party cookies, multiple third party cookies or combinations thereof. In some cases, a cookie value with a unique value can be used to identify the entity to various systems; a unique cookie value may or may not comprise personally identifiable information (PII) such as a person's name or street address.

In some cases, the discovery system 100 may be permitted to maintain individual histories per entity 120 or access systems which maintain individual histories per entity. For example, entity 120 may have agreed to allow a system, such as discovery system 100 or a direct measurement system, to maintain a history, such as a media consumption history. In some cases, in exchange for permission to maintain an individual history per entity, an entity 120 may receive compensation, such as the ability to access networked resources, discounted goods, discounted services, money, or combinations thereof. Although only one entity 120 is shown in FIG. 1 for clarity, multiple entities may be connected to the communications network 150.

Entities may differ with respect to their privacy preferences, and certain entities may consent to having more information maintained at a discovery system 100 them than other entities. Additionally, each data partner typically establishes limitations which govern the acceptable use of information provided by the data partner. The system may filter or restrict the usage of information provided by data partners in order to meet contractual obligations or legal obligations defined according to the laws of a jurisdiction of importance, such as the State of California, the United States, or the European Union, for example.

A content provider 110 may be integrated with a direct measurement system which can collect information for an entity, such as entity 120, in conjunction with an identifier, such as entity identifier 121. For example, when entity 120 requests content 111 from a content provider 110, such as a request from a web browser operating on a personal computer to display the content of a web page of an online publisher, the content provider 110 can re-direct the entity 120 to submit a pixel request to the direct measurement system. Based on the pixel request, and optional subsequent actions, the direct measurement system can collect information from the entity 120 and information associated with the entity 120. In an example, the information may comprise a referral string comprising query terms submitted to an online search engine to locate an item of content. Information is collected in conjunction with an identifier, such as entity identifier 121, in order to enable the maintenance of a coherent body of information, such histories which document measurable events such as the consumption of content, for an entity over time. In some cases, a discovery system 100 may comprise an internal direct measurement system. In some cases, a discovery system 100 may be integrated with one or more external direct measurement systems.

A content provider which is a mobile application vendor or a mobile application service provider may provide content to an entity. For example, a content provider may provide software to a mobile phone. In an example, a mobile application can be integrated with measurement instructions in the form of a software developers kit (SDK) which enables the mobile application to collect information about a mobile device, a mobile application or both. The SDK may enable a mobile device to collect information which can be used to assess advertisement viewability. Furthermore, the SDK includes methods for sending an event notification comprising information to a system over a network 150 such as, but not limited to, a direct measurement system and discovery system 100.

Information can include a consumption history for an entity, such as records of the execution of measurable events and attribute values. In some cases, the context of an event, such as the duration and quality of a consumption event, can be provided to the discovery system and may become part of a history accessible by the discovery system 100. In an example, information associated with the hardware configuration, software configuration or volume settings during the delivery of an audio advertisement can be provided to the discovery system as part of an event notification. In some cases, information describing interactions with content, such as pausing an online video clip or scoring points in a game operating on a mobile phone, may be provided to a system such as a discovery system, a direct measurement system or both. In some cases, the SDK may enable a mobile device to assess advertisement viewability; viewability ratings, scores or combinations thereof may be sent to a system such as a direct measurement system, a discovery system or both.

An advertising exchange, such as advertising exchange system 130, is an electronic marketplace for buying and selling advertising impressions, such as the opportunity to expose a specified entity to advertising content delivered over a network. In an example, a real time bidding (RTB) advertising exchange can support the rapid auction of advertising impressions as they become available. For example, the advertising exchange system 130 can be notified by a content provider 110 after an entity 120, requests content 111 from the content provider 110 and an opportunity to display an advertising impression to that entity becomes available.

The advertising exchange system 130 can provide bid requests, such as a stream of bid requests, to a campaign operations system 140, with each bid request describing the opportunity to expose a specified entity to advertising content which is available for bidding. A bid request can comprise a request for a bid price. For example, the advertising exchange may provide features in a bid request which describe the advertising impression, such as the size of the advertisement, the position of the advertising impression with respect to a web page, the website location of the advertising impression, the context or topic of the display webpage associated with the advertising impression. The specified entity which is the intended recipient of the advertising impression may be described in the bid request with information, such as the local time of day for that entity and an identifier. A unique cookie value is an example of an identifier that may be sent by the advertising exchange. Some information which is provided in the bid request may be provided to the advertising exchange system from the content provider. Some advertising exchange systems enable auction participants to set or retrieve one or more variables, such as a browser cookie value, with the specified entity. The discovery system 100 or the campaign operations system 140 can use this feature to set and retrieve a unique variable value such as an identifier, a non-unique variable value such as a group identifier, or combinations thereof. Each advertising exchange typically establishes limitations which govern the acceptable use of information included in a bid request. The discovery system 100 may filter or restrict the usage of information included in a bid request in order to meet contractual obligations.

An advertising exchange system 130 receives bid responses related to a bid opportunity, which can include a bid price, selects the winning bid and enables the winning bidder's advertising content to be sent to an entity. In some cases, an advertising server system (not shown) may be integrated into the process, and the advertising content may be served to an entity by the advertising server system on behalf of the winning bidder. For example, an advertising server system can comprise a web server for storing online advertising content and delivering the online advertising content to entities, such as website visitors, through a client device. A local advertising server system may only provide services for a single content provider, whereas third-party advertising server systems can provide services in conjunction with multiple content providers.

A campaign operations system 140 operates an advertising campaign on behalf of an advertiser. A demand side platform (DSP) is an example of a campaign operator that can operate multiple advertising campaigns on behalf of multiple advertisers. In an example, a campaign operations system 140 can be integrated with one or more advertising exchange systems 130, and receive one or more streams of bid requests. The campaign operations system 140 can assess a bid request to determine the suitability of the opportunity to expose a specified entity to advertising content for an advertising campaign. In some cases, assessing the suitability of an opportunity can comprise assessing an opportunity with respect to an advertising campaign to reflect a likelihood of conversion by categorizing, scoring or rating the opportunity, the specified entity associated with the opportunity or both. In various embodiments, a campaign operations system 140 can take a subsequent action such as, but not limited to: configuring a bid response, sending a bid response to an advertising exchange system 130, customizing an advertising creative, selecting advertising content, selecting a bid price, selecting a campaign which best suits the opportunity, or combinations thereof.

An advertising exposure results from the delivery of advertising content over a network 150 to an entity. Advertising exposures can comprise content such as textual content, graphical content, video content, audio content or multi-media content which may be embedded in or delivered in conjunction with web pages, networked game displays, mobile application interfaces, multi-media presentations, video content, audio content or combinations thereof. An advertising exposure can be a simple exposure which does not require or enable end-user interaction. Some examples of advertising exposures can enable end-user interaction, such as an online advertisement which allows an end-user to click-through to the advertiser's web page or an in-game advertisement which allows an end-user to submit a vote in an opinion survey; similarly, an advertising exposure such as a paid search result can enable end-user interaction, such as a click-through to an advertiser's website.

In an embodiment, discovery system 100 comprises a feature tree manager 102, a model manager 104, a performance monitor 106, a discovery module 108 and a data repository 109. In an embodiment, discovery system 100 may further comprise a campaign operations system such as campaign operations system 140. A discovery system 100 can generate an initial model for use in an online advertising campaign. One or more features of the model are also represented in the hierarchically arranged nodes of a feature tree. Each child node in the feature tree represents a feature of increased specificity or granularity over its respective parent node's feature. The discovery system detects a degraded feature by comparing a feature's performance metric of a first time window to the feature's performance metric of a second time window. The degraded feature can be matched to a feature of a node of the feature tree. The discovery system selects a prospective model feature from the feature tree by selecting a higher level node, such as an ancestor node or uncle node, of the matched feature's node. A performance metric of the prospective model feature can be estimated for a recent time window, such as the second time window. The model can be updated with a new model feature comprising the prospective model feature, if the estimated performance metric looks promising. An updated advertising campaign can be operated and the results of applying the new model to the history of an entity may be used to configure a bid response, select a bid price, select advertising content, customize advertising content, or combinations thereof.

Figure 2:
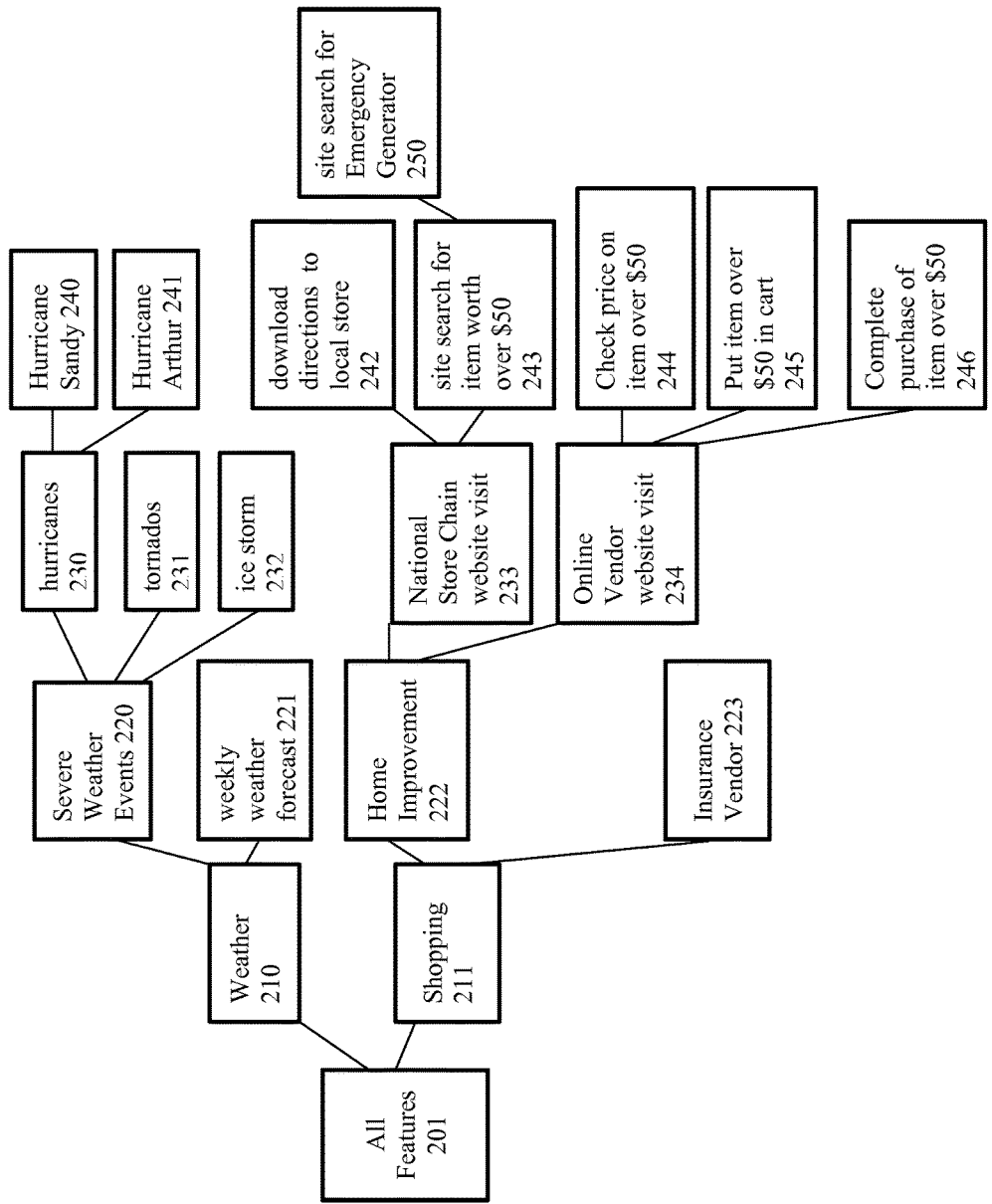
FIG. 2 illustrates an example of a feature tree.

A feature tree manager 102 manages feature trees. As previously discussed, a feature tree comprises a root node and hierarchically arranged nodes. FIG. 2 is an example of a feature tree. Each node corresponds to a feature and each child node corresponds to a feature of increased specificity or granularity over its respective parent node's feature. A child node of increased specificity over a parent node means that a feature of the child node is more granular than a feature of the parent node. For example, in FIG. 2, node 230 represents the feature "hurricanes". Node 240 is a child node of node 230; node 240 represents the feature "Hurricane Sandy", which is more specific than the feature of its parent node. The feature of child node 240 ("Hurricane Sandy") is an example of a feature of parent node 230 ("hurricanes"). "Hurricane Sandy" is more specific than "hurricanes". That is to say that all the child node features (such as "Hurricane Sandy" of child node 240 or "Hurricane Arthur" of child node 241) are a subset of their parent node's feature ("hurricane" of parent node 230). In an example, a "Hurricane Sandy" feature may refer to a feature found in an entity's history such as a record of executing a local or Internet search with the keyword phrase "Hurricane Sandy", a visit to a webpage on the topic of "Hurricane Sandy", a donation to an online charity benefitting victims of "Hurricane Sandy" or combinations thereof.

A hierarchical tree has levels, which are counted based on the number of connections between a node and the root node. In the example illustrated in FIG. 2, node 201 is the root node. Nodes 210 and 211 are at the same level (second level). Nodes 220, 221 222 and 223 are at the same level (third level) and are "lower level nodes" with respect to nodes 210 and 211. Nodes 210 and 211 are "higher level nodes" with respect to nodes 220, 221 222 and 223. Nodes 210, 211, 220, 221, 222 and 223, as well as the root node 2013, are higher level nodes of Node 230 (fourth level). Node 230 has eight lower level nodes (Nodes 240, 241, 242, 243, 244, 245, 246 and 250).

In an embodiment, the feature tree manager 102 may receive a feature tree configuration comprising the descriptions of multiple nodes as well as the node-to-node relationships, enabling the feature tree manager 102 to create a feature tree such as feature tree 200. For example, a feature tree may be configured by a campaign operator through a graphical user interface and provide the configuration to the discovery system 100.

Figure 3:
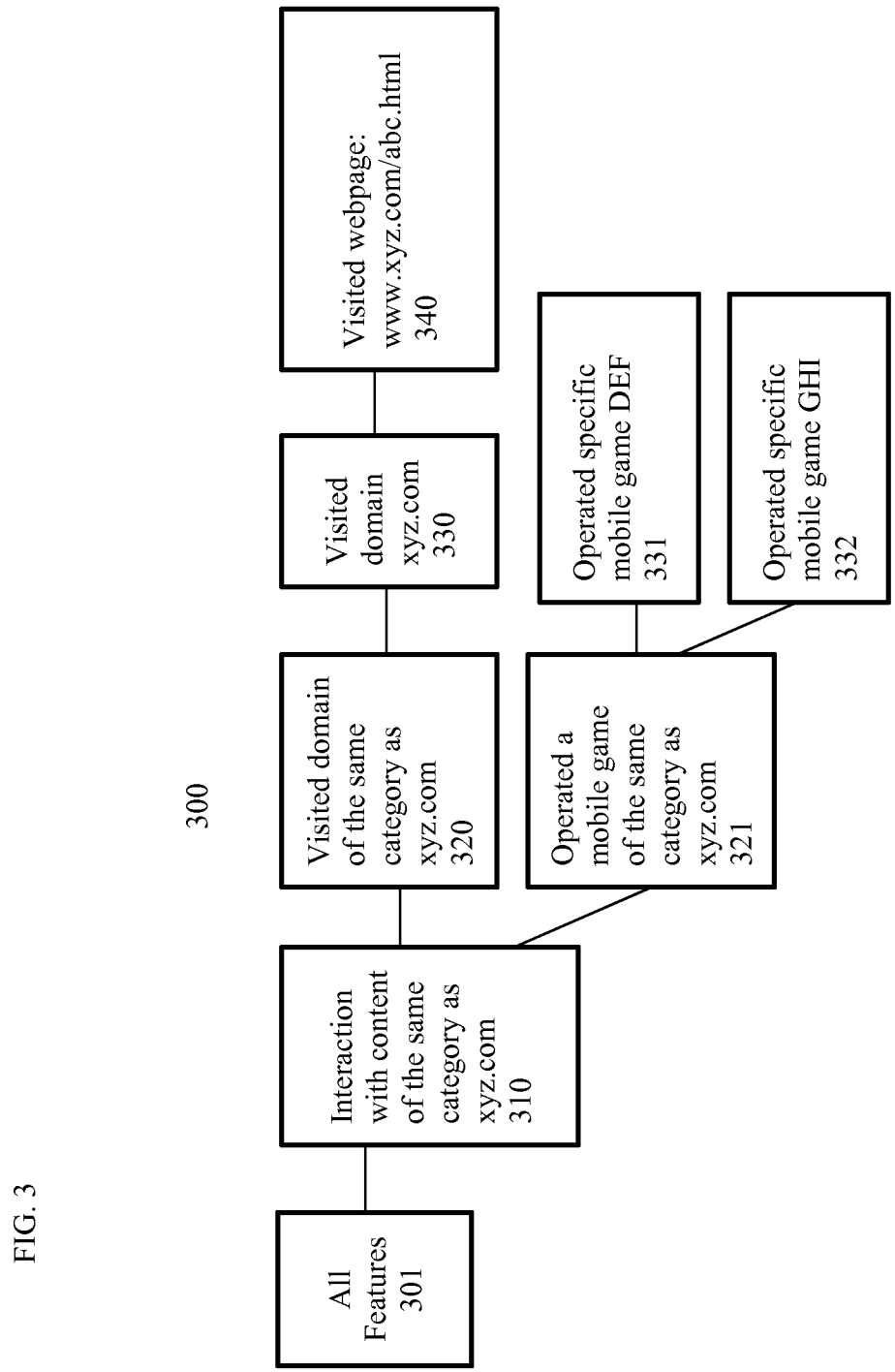
FIG. 3 is an example of a feature tree constructed by the discovery system.

In some cases, the nodes of a feature tree may correspond to the features of an existing model. For example, a model may be developed by comparing the frequency of features found in histories of a set of converters to the expected frequency of those features in a general population. As a result, distinctive features may be identified which occur in the converter group with a frequency that is higher (or lower) than the frequency of those distinctive features in the general population. In an example, the model's features may be used to construct a feature tree. FIG. 3 is an example of a feature tree 300 constructed by the discovery system 100. For example, the leaf nodes of the feature tree may comprise distinctive features of the converter set. In an example, the discovery system may automatically abstract the distinctive features of the leaf nodes to generate parent nodes for the leaf nodes. For example, a distinctive feature such as "visited a specific webpage" may be abstracted to generate the hierarchical structure illustrated in FIG. 3. In this example, the leaf node 340 representing "visited webpage www.xyz.com/abc.html" may be provided to the discovery system 100. The discovery system may automatically generate ancestor nodes (in this example, a parent node 330, a grandparent node 320 and a great-grandparent node 330) by abstracting the feature of node 340. The parent node 330 represents the feature of "visited domain xyz.com" and is less specific than its child node 340 which represents the feature of visiting a specific webpage of that domain. Grandparent node 320 is less specific than node 330, and represents the feature of visiting a domain of the same category of xyz.com. Ancestor node 310 is less specific than its child node 320, and represents the feature of "interaction with content of the same category as xyz.com; for example, this may encompass a history feature relevant to the operation of a mobile application or networked game.

In an example, a discovery system 100 may create a feature tree, or portions thereof, by generating and inserting child nodes of increasing specificity for a node, such as node 310. In an example, the discovery system 100 may have access to resources which describe the categorization of web pages, domains and mobile applications. The discovery system 100 may automatically generate increasingly specific child nodes, such as child node 321 and grandchildren nodes 331 and 332 based on these resources.

In an embodiment, the discovery system 100 may add nodes, delete nodes or both responsive to input. For example, the discovery system 100 may be notified of a trend, such as a website which is rapidly growing in popularity. The discovery system 100 may receive or determine the category of the trending website and insert one or more nodes into a feature tree based on the category of the trending website. For example, if the discovery system 100 receives a notification regarding a trending feature in the same category as domain xyz.com, a new child node representing the trending node may be automatically created and inserted into feature tree 300 as a child node to node 320. In an example, the post-conversion history of converters may be monitored to detect new or trending features which may be assessed for inclusion in an updated model, an updated feature tree or both.

Model manager 104 creates, updates and maintains models which are used in the operation of advertising campaigns. A model for targeting advertisements on behalf of a campaign can be built based on the histories of entities. A behavioral model, developed by comparing the histories of converters with the histories of a standard population or the histories of non-converters, can be applied to the history of an entity to determine the behavioral similarity of the entity to the set of converters. The results of applying such a model to the history of an entity may be used to configure a bid response, select an entity to receive specific advertising content, select a bid price, customize advertising content sent to the entity, customize content sent to the entity or combinations thereof.

Campaign managers typically look to build on prior success by seeking other people who are like the people who have responded positively to the campaign or the advertised product in the past. An archetypical set of entities, such as a set of converters may be selected. The archetypical set may comprise a set of entities which have a specific conversion event in their respective histories (such as an online purchase event, a click through at a particular website, or the completion of a registration form). A standard population may be selected or implied. Examples of a standard population are: a population of non-converters, the whole population of internet consumers or a subset of the whole population of internet consumers based on a geographic constraint, a demographic characteristic, or an event in their respective consumption histories. The features of the standard population may be derived from entity histories, bulk data such as census data, or both. By analyzing the features of the archetypical set compared to the features of the standard population, the distinguishing features of the archetypical set may be distinguished from the features of a standard population, such as the whole population of internet consumers, a subset of the whole population of internet consumers based on a geographic constraint, a demographic characteristic, or an event in their respective consumption histories.

Features which are most strongly correlated with the features of the archetypical set compared to the standard population can be used to form a model. For example, the model may be constructed with distinctive features. A distinctive feature is a feature which occurs in the histories of the archetypical set with a frequency that is higher or lower than the frequency of the same feature in the standard audience. In an example, converters for a property insurance campaign may have viewed news stories about Hurricane Sandy with a frequency that is much higher than was seen in the general Internet population; in this case, the feature "viewed news story about Hurricane Sandy" may be selected as a feature of a model constructed for a property insurance campaign. The resulting behavioral model can be applied to the history of an entity to determine the behavioral similarity of the entity to the archetypical set of entities, such as a set of converters. The results of applying such a model to the history of an entity may be used to configure a bid response, select an entity to receive specific advertising content, select a bid price, customize content sent to the entity, customize advertising content sent to the entity or combinations thereof.

One or more of the features of a model generated by model manager 104 may be represented by nodes of a feature tree, such as feature tree 200. In some embodiments, the model manager creates a model using features found in an existing feature tree. In some embodiments, the feature tree, or a portion thereof, is created to include some or all of the features of a previously constructed model.

Performance Monitor 106 assesses the performance of features of a model used in the operation of an advertising campaign. In some embodiments, the performance monitor may assess the performance of one or more model features responsive to detecting diminished performance of a campaign. In some embodiments, the performance of one or more model features may be monitored instead of or in addition to monitoring a campaign's performance. In an example, the frequency with which a model feature appears in the histories of campaign converters compared to the frequency with which the same model feature appears in the histories of a standard audience is an example measure of a feature's performance metric; a degraded performance metric indicates a degraded feature.

In an example, a model for an insurance campaign may have been developed around the time of Hurricane Sandy, with the model including a feature of "viewed content with a topic of Hurricane Sandy". In this example, the histories of entities which converted for the insurance campaign included a feature of "viewed content with a topic of Hurricane Sandy" with a frequency that far exceeded the frequency of that feature in the histories of a standard population of non-converters. However, over time, the feature "viewed content with a topic of Hurricane Sandy" degraded; the frequency of the feature in the histories of converters approached the frequency of that feature in the histories of a standard population of non-converters. Advantageously, embodiments of the invention detect a degraded feature by comparing a performance metric of a model feature from a first time window with a performance metric of the same model feature from a second time window. If the performance metric has degraded enough (i.e. the absolute change in performance metric is greater than a threshold value or the performance metric falls below a minimum level), the discovery system 100 initiates a process of feature discovery. In some cases, the first and second time windows may be disjoint (i.e. the first and second time windows do not overlap). In some cases, some portion of the first time window may overlap with some portion of the second time window, but at least some portion of the first time window does not overlap with the second time window.

In an embodiment, the performance monitor may infer the presence of a degraded model feature based on the performance of an advertising campaign. In an example, a performance metric of an advertising campaign may be received or calculated by the discovery system. Average Cost Per Acquisition (CPA), conversion rate and conversion volume are examples of a campaign performance metric. In some embodiments, performance monitor 106 monitors the performance of an advertising campaign to determine if there is any need to adjust the model. For example, performance monitor 106 may compare an advertising campaign's performance metric of a first time window to the same advertising campaign's performance metric of a second time window to detect if there is a downward trend. In some cases, a downward trend in the performance metric of a campaign may indicate that one or more features of the model are degraded. In some embodiments, the detection of a downward trend triggers the discovery system 100 to explore a feature tree for a feature which may be included in an updated version of an advertising campaign's model.

Discovery module 108 discovers model features which can be included in an updated model. In an example, discovery module 108 may receive a notification from performance monitor 106 that a campaign model's feature is degraded. In response, the discovery module 108 can interact with the feature tree module 102 to match the degraded feature with a feature of a node of a feature tree. The discovery module 108 selects one or more prospective model features of higher level nodes (i.e. nodes which are closer to the root node than the matching feature's node), such as ancestor nodes of the matching feature's node. For example, the parent node, the uncle node, the grandparent node, the great-grandparent node of the matching feature's node, or combinations thereof, may be selected. In an example, the discovery module 108 may interact with the performance monitor to estimate a performance metric for one or more prospective model features. For example, using histories of converters, the performance monitor may estimate a performance metric for one or more prospective features over a time window. A recent time window may be selected so that the estimated performance metrics can be compared with the performance metrics of the degraded feature. For ease of comparison, the recent time window may be the same as the second time window used to detect the degraded feature. A prospective feature may be included in an updated model if the prospective feature's estimated performance metric meets one or more performance criteria such as a minimum performance metric value or a minimum improvement over a performance metric of a degraded feature's performance metric. In some cases, the updated model may not include the degraded feature.

In an embodiment, the discovery module 108 can trigger the feature tree module to update a feature tree responsive to the discovery of a degraded feature, on a schedule, or both. For example, histories of entities may be monitored to discover emerging features such as new keywords in keyword searches or trending events, which may be incorporated into an updated feature tree. In an example, the post-conversion histories of converters may be monitored to discover features. New nodes may be inserted into an updated feature tree, with each new node representing one or more discovered features. In an example, the discovery module 108 can then select one or more prospective model features from a newly updated feature tree. In an embodiment, the discovery module 108 can select one or more prospective model features comprising a feature of any node in the feature tree.

Figure 4:
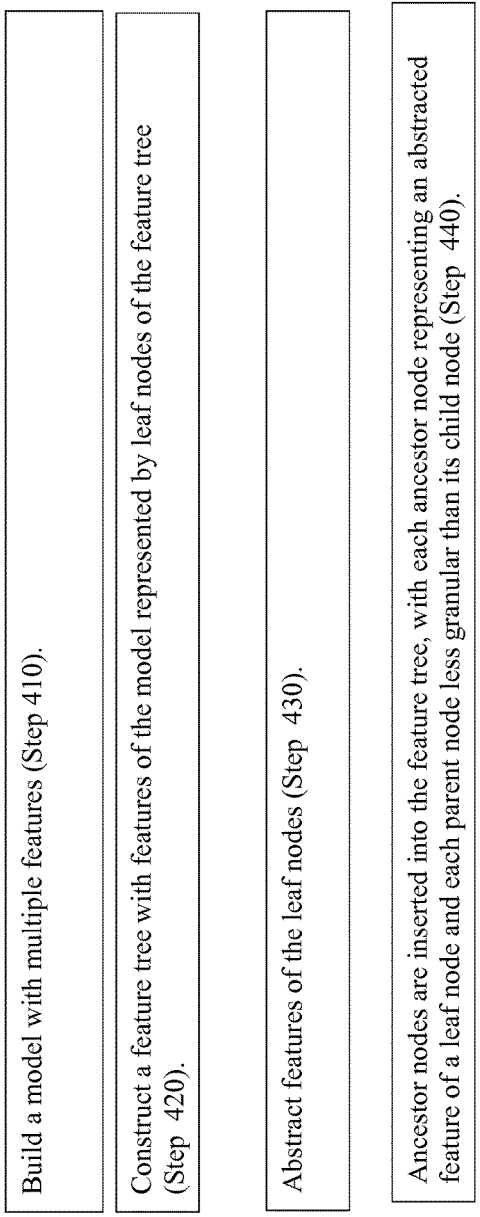
FIG. 4 is a flow chart illustrating an example of a method of constructing a feature tree according to an embodiment.

FIG. 4 is a flow chart illustrating an example of a method 400 of constructing a feature tree according to an embodiment.

Referring to Step 410, a model with multiple features is built. The similarity of an entity to a converter or target audience can be assessed by applying the model to the entity's history. Features of the model are matched to features in the entity's history such as the domain of a website the entity visited in the past. Based on the results of applying the model to an entity's history, a campaign system can make a decision such as how much to bid on a Real Time Bidding (RTB) Exchange for an opportunity to expose the entity to advertising or how to customize content or an advertisement for the entity.

Referring to Step 420, a feature tree is constructed with features of the model represented by leaf nodes of the feature tree. In some examples, one or more of the model features are represented by leaf nodes of the feature tree.

Referring to Step 430, the features of the leaf nodes are abstracted. For example, a feature of a leaf node such as "visited www.xyz.com/abc.html" (node 340) may be abstracted to "visited domain xyz.com" (node 330) and inserted as a parent node to the leaf node (node 340), between the leaf node (node 340) and the root node (all features 301). In some cases, the discovery system 100 may have access to information or systems which support the abstraction process. For example, discovery system 100 may assess an element of a leaf node's feature (e.g. www.xyz.com/abc.html), use a domain lookup tool (such as a "whois" tool) to identify the registered owner of the domain and abstract the feature of the leaf node to "visited a website owned by XYZ Corporation". In an example, the discovery system 100 may have access to a system which provides the category of a website. In this case, the discovery system may abstract a feature such as "visited domain xyz.com" to "visited a software vendor's website" or "visited a domain of the same category as xyz.com" (node 320) and insert a new node 320 as a parent to node 330, between node 320 and the root node 301. In an example, the discovery system 100 may analyze the content of a web page and abstract a feature of visiting that web page based on the topics presented in the content. For example, the discovery system 100 may crawl the websiteabc.com/page1.html web page, analyze the content and abstract the leaf node 340 to "visited a website on the topic of yoga". In an example, a feature may be abstracted by broadening a time window; for example, a feature of "visited websiteabc.com in the last 24 hours" may be abstracted to "visited websiteabc.com in the last week".

Referring to Step 440, ancestor nodes are inserted into the feature tree, with each ancestor node representing an abstracted feature of a leaf node and each parent node less granular than its child node(s).

FIG. 5 is a flow chart illustrating an example of a method 500 of building a model using features represented by nodes of a feature tree, according to an embodiment.

Referring to Step 510, a feature tree is constructed with nodes of the feature tree representing features and each child node feature more specific than a feature of its parent node. In an example, the features represented in the feature tree may comprise features found in the histories of entities. For example, features which occur with a high frequency in the histories of entities may be selected for inclusion in a feature tree. In an example, features may comprise keywords submitted to a search engine to locate content on the Internet. Keywords which are popular or are increasing in popularity among a desirable set of entities (such as a set of converters or a set of high-income entities) may be selected for representation in nodes of the feature tree. In an example, histories of a set of entities, such as a set of converters, may be monitored for distinctive features, trending features or both. Nodes representing trending features of a set of converters may be automatically created and inserted into feature tree 300; for example, such nodes may be automatically created and inserted into feature tree 300 periodically, as they are discovered, or whenever the feature tree is updated.

Referring to Step 520, a model comprising multiple features of the feature tree is built. The model may be a behavioral model constructed by comparing the histories of entities in an archetypical set of entities (such as a set of converters) to the histories of a standard audience of entities (such as non-converters or the general population); features of the model are distinctive features which occur in the histories of the archetypical set of entities with a frequency that is greater than (or less than) the frequency seen in a standard audience. As previously discussed, the similarity of an entity to a converter or target audience can be assessed by applying the model to the entity's history. Features of the model are matched to features in the entity's history such as the domain of a website the entity visited in the past. Based on the results of applying the model to an entity's history, a campaign system can make a decision such as how much to bid on a Real Time Bidding (RTB) Exchange for an opportunity to expose the entity to advertising or how to customize content or an advertisement for the entity. In an example, a campaign system may configure a bid response by selecting an advertising campaign, selecting advertising content, customizing advertising content, selecting a bid price or combinations thereof based on the results of applying the model to an entity's history.

Figure 6:
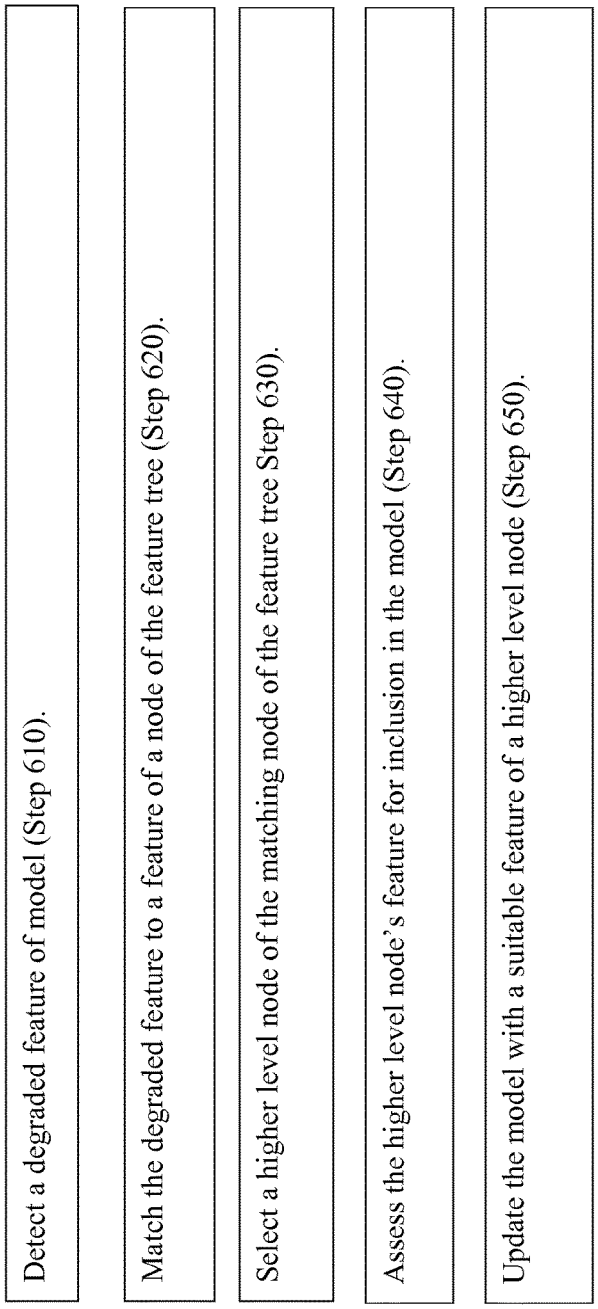
FIG. 6 is a flow chart illustrating an example of a method for automatically updating a model, according to an embodiment.

FIG. 6 is a flow chart illustrating an example of a method 600 for automatically updating a model, according to an embodiment.

Referring to Step 610, a degraded feature of a model is detected. In an example, the performance of a campaign may be measured, and the presence of a degraded feature inferred based on the degraded performance of the campaign. A performance metric for a campaign (such as the average Cost Per Acquisition (CPA) or conversion volume) may be measured for two different time windows to determine if the campaign performance is degraded. A degraded model feature may be detected at the discovery system 100 by comparing a performance metric of a model feature from a first time window to a performance metric of the model feature from a second time window. The frequency with which a model feature appears in the histories of campaign converters compared to the frequency with which the same model feature appears in the histories of a standard audience is an example measure of a feature's performance metric; as this measure decreases, the model feature degrades. In some cases, more than one degraded model feature may be identified.

Referring to Step 620, the degraded feature is matched to a feature of a node of the feature tree. In some cases, the feature tree may be updated before attempting to match the degraded feature. In some embodiments, a discovery process is initiated responsive to detecting a degraded feature. In an example, the discovery process can be automatic. The discovery system 100 may update the feature tree with features which are trending in the general population or among a set of entities such as a set of converters.

Referring to Step 630, a higher level node of the matching feature's node is selected. A feature of a higher level node (i.e. a node closer to the root node), such as a feature of an ancestor node, an uncle node, a parent node, a grandparent node or a great-grandparent node, is less granular or less specific than a matching feature. In some cases, more than one higher level node may be selected and subsequently assessed for inclusion in the model. In some cases, features of other nodes in the feature tree (such as one or more nodes at the same level as the matching feature's node, one or more nodes at a lower level or combinations thereof) may be investigated in addition to one or more higher level nodes. In some embodiments, the higher level nodes may be limited to ancestor nodes (e.g. a parent node and grandparent nodes may be selected but uncle nodes may be excluded).

Referring to Step 640, the selected node's feature is assessed for inclusion in the model. In an example, a performance metric of a higher level node's feature may be estimated for a time window. The estimated performance metric may be compared to the degraded feature's performance metric for the same (or similar) time window to determine if the higher level node's feature should be incorporated into the model. In some cases, a prospective feature may be assessed with respect to one or more performance criteria such as a minimum performance metric value or a minimum improvement in a performance metric over the degraded feature's performance metric.

Referring to Step 650, the model is updated with a suitable feature of a higher level node. In some cases, one or more degraded features may be removed from the model.

Figure 7:
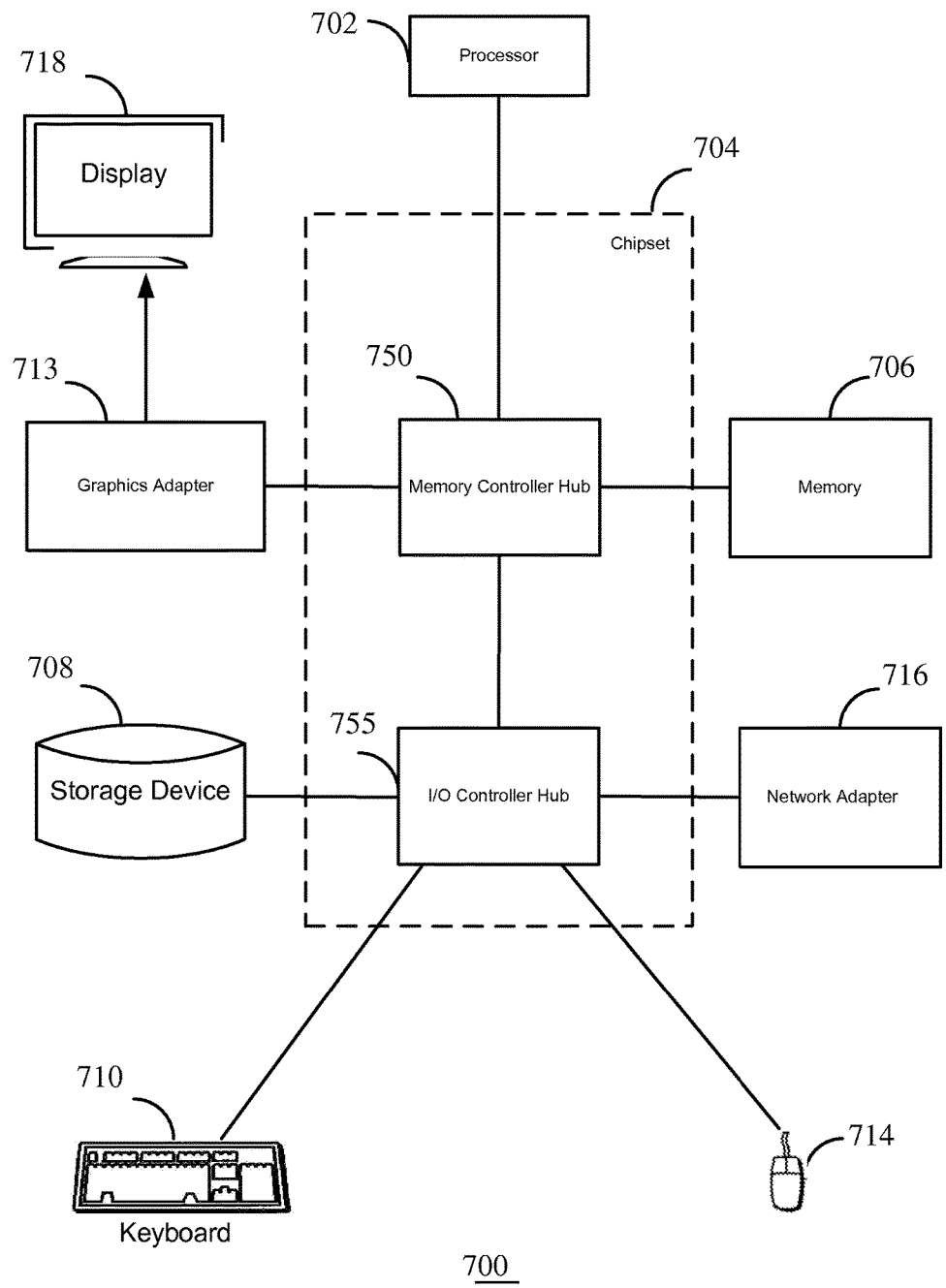
FIG. 7 is a high-level block diagram illustrating an example of a computer for use as a discovery system, content provider, entity, advertising exchange system or campaign operations system, in accordance with an embodiment of the invention.

FIG. 7 is a high-level block diagram of a computer 700 for use as the discovery system 100, content provider 110, entity 120, advertising exchange system 130 campaign or operations system 140 according to one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of to the chipset 704.

The storage device 708 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 700. The graphics adapter 712 displays images and other information on the display 718. The network adapter 716 couples the computer system 700 to the network 150.

As is known in the art, a computer 700 can have different and/or other components than those shown in FIG. 7. In addition, the computer 700 can lack certain illustrated components. In one embodiment, a computer 700 acting as the discovery system 100 is formed of multiple spatially and/or time distributed blade computers and lacks a keyboard 710, pointing device 714, graphics adapter 712, and/or display 718. Moreover, the storage device 708 can be local and/or remote from the computer 700.

The computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The order of the steps in the foregoing described methods of the invention are not intended to limit the invention; the steps may be rearranged.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The described embodiments also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the embodiments disclosed herein without departing from the spirit and scope as defined in the claims.

What is claimed is:

1. A computer-implemented method comprising:
generating a feature tree comprising a root node and a plurality of hierarchically arranged nodes, each node corresponding to a feature of browser histories, each child node corresponding to a feature of increased specificity over a respective parent node's feature;
creating a model, the model configured to assess a browser's suitability for receiving advertising content of an advertising campaign based on features of the browser's history, the model comprising a plurality of features represented in the feature tree;
operating the advertising campaign using the model, the operating comprising;
  selecting a plurality of browsers suitable for the advertising campaign according to a result of applying the model to the respective browser's history;
  sending advertising content of the advertising campaign to the first set of browsers;
  detecting a degraded feature, the detecting comprising:
    comparing a campaign performance metric of a feature of the model from a first time window to a campaign performance metric of the feature of the model from a second time window that is more recent than the first time window, the campaign performance metric an indication of the predictive value of the feature for the success of the campaign; and responsive to a decrease in the campaign performance metric of the feature of the model from the first time window to the second time window, identifying the feature of the model as a degraded feature; and matching a feature of the feature tree with the degraded feature;

responsive to detecting a degraded feature, automatically updating the model, at the discovery system, comprising:

discovering nodes of decreased specificity over the matching feature's node by discovering nodes from the feature tree which are closer to the root node of the feature tree than the matching feature's node; and adding a feature of a node selected from the discovered nodes, to the model; and deleting the degraded feature from the model;

operating an updated advertising campaign, the operating comprising:

responsive to receiving a notification, from a real-time advertising exchange, of an opportunity to send advertising content to an available browser, applying the updated model to the available browser's history; and sending advertising content of the advertising campaign to the available browser according to a result of applying the updated model, before the opportunity expires.

2. The method of claim 1 wherein operating an updated advertising campaign comprises:
selecting a bid price based on the result of applying the updated model.

3. The method of claim 1 wherein operating an updated advertising campaign comprises:
selecting advertising content based on the result of applying the updated model.

4. The method of claim 1 wherein operating an updated advertising campaign comprises:
customizing advertising content based on the result of applying the updated model.

5. The method of claim 1 wherein:
the new feature corresponds to an ancestor node of the matching feature's node.

6. The method of claim 1 wherein:
the feature tree is generated before the model is created; and
creating the model comprises creating the model with features of the feature tree comprising at least one feature which corresponds to a child node in the feature tree.

7. The method of claim 1 wherein:
the model is created before the feature tree is generated; and
generating the feature tree comprises generating nodes corresponding to features of the feature tree wherein at least one child node in the feature tree corresponds to a feature of the model.

8. The method of claim 1 wherein updating further comprises:
selecting a prospective model feature from the features corresponding to the nodes of the feature tree;

creating a prospective model comprising the prospective model feature;
estimating a performance metric of the prospective model feature by simulating campaign operation with the prospective model.

9. The method of claim 8 further comprising:
selecting the new feature from one or more prospective model features based on the results of estimating.

10. The method of claim 1 wherein a second new feature comprises a feature of a descendant of an ancestor node of the degraded model feature.

11. The method of claim 1 wherein a second new feature comprises a feature of a descendant of the degraded model feature's node.

12. The method of claim 1 further comprising:
searching for an updated feature.

13. The method of claim 12 wherein:
searching is initiated responsive to detecting the degraded feature.

14. The method of claim 12 wherein:
searching is initiated responsive to detecting a change in the performance of the advertising campaign.

15. The method of claim 12 wherein:
searching is initiated responsive to detecting a change in the performance of at least one model feature.

16. The method of claim 12 wherein:
the updated feature comprises a distinctive feature found in post-conversion histories of converters with a frequency which is different from a frequency of the distinctive feature's occurrence in the histories of a standard population.

17. The method of claim 12 wherein searching comprises:
searching for a feature which is increasing in popularity in a population.

18. The method of claim 12 further comprising:
adding a node representing the updated feature to the feature tree.

19. A nontransitory computer readable storage medium including computer program instructions that, when executed, cause a computer processor to perform operations comprising:

generating a feature tree comprising a root node and a plurality of hierarchically arranged nodes, each node corresponding to a feature of browser histories, each child node corresponding to a feature of increased specificity over a respective parent node's feature;

creating a model, the model configured to assess a browser's suitability for receiving advertising content of an advertising campaign based on features of the browser's history, the model comprising a plurality of features represented in the feature tree;

operating the advertising campaign using the model, the operating comprising;

selecting a plurality of browsers suitable for the advertising campaign according to a result of applying the model to the respective browser's history;

sending advertising content of the advertising campaign to the first set of browsers;

detecting a degraded feature, the detecting comprising:
comparing a campaign performance metric of a feature of the model from a first time window to a campaign performance metric of the feature of the model from a second time window that is more recent than the first time window, the campaign performance metric an indication of the predictive value of the feature for the success of the campaign; and responsive to a decrease in the campaign performance metric of the feature of the model from the first time window to the second time window, identifying the feature of the model as a degraded feature; and matching a feature of the feature tree with the degraded feature;

responsive to detecting a degraded feature, automatically updating the model, at the discovery system, comprising:

discovering nodes of decreased specificity over the matching feature's node by discovering nodes from the feature tree which are closer to the root node of the feature tree than the matching feature's node; and adding a feature of a node selected from the discovered nodes, to the model; and deleting the degraded feature from the model;

operating an updated advertising campaign, the operating comprising:

responsive to receiving a notification, from a real-time advertising exchange, of an opportunity to send advertising content to an available browser, applying the updated model to the available browser's history; and sending advertising content of the advertising campaign to the available browser according to a result of applying the updated model, before the opportunity expires.

20. A system comprising:

a computer processor; and a computer readable storage medium soring processor-executable computer program instructions, the computer program instructions comprising instructions for:

generating a feature tree comprising a root node and a plurality of hierarchically arranged nodes, each node corresponding to a feature of browser histories, each child node corresponding to a feature of increased specificity over a respective parent node's feature;

creating a model, the model configured to assess a browser's suitability for receiving advertising content of an advertising campaign based on features of the browser's history, the model comprising a plurality of features represented in the feature tree;

operating the advertising campaign using the model, the operating comprising;

selecting a plurality of browsers suitable for the advertising campaign according to a result of applying the model to the respective browser's history;

sending advertising content of the advertising campaign to the first set of browsers;

detecting a degraded feature, the detecting comprising:

comparing a campaign performance metric of a feature of the model from a first time window to a campaign performance metric of the feature of the model from a second time window that is more recent than the first time window, the campaign performance metric an indication of the predictive value of the feature for the success of the campaign; and responsive to a decrease in the campaign performance metric of the feature of the model from the first time window to the second time window, identifying the feature of the model as a degraded feature; and matching a feature of the feature tree with the degraded feature;

responsive to detecting a degraded feature, automatically updating the model, at the discovery system, comprising:

discovering nodes of decreased specificity over the matching feature's node by discovering nodes from the feature tree which are closer to the root node of the feature tree than the matching feature's node; and adding a feature of a node selected from the discovered nodes, to the model; and deleting the degraded feature from the model;

operating an updated advertising campaign, the operating comprising:

responsive to receiving a notification, from a real-time advertising exchange, of an opportunity to send advertising content to an available browser, applying the updated model to the available browser's history; and sending advertising content of the advertising campaign to the available browser according to a result of applying the updated model, before the opportunity expires.

* * * * *